(12) United States Patent
Gasendo

(10) Patent No.: US 7,931,435 B1
(45) Date of Patent: Apr. 26, 2011

(54) WIND POWER MEGAWATTS PRODUCER

(76) Inventor: Leonardo M. Gasendo, Camarillo, CA (US)

( * ) Notice: Subject to any disclaimer, the term of this patent is extended or adjusted under 35 U.S.C. 154(b) by 0 days.

(21) Appl. No.: 12/657,589

(22) Filed: Jan. 25, 2010

(51) Int. Cl.
*F03D 3/06* (2006.01)
*F03D 11/00* (2006.01)

(52) U.S. Cl. ............... 415/2.1; 415/53.1; 415/122.1; 416/132 A; 416/132 B; 416/170 R; 416/229 R; 416/230; 74/572.2; 74/572.21

(58) Field of Classification Search ............ 415/2.1, 415/4.1–4.5, 53.1–53.3, 122.1, 124.2, 905, 415/907, 908; 416/132 R, 132 A, 132 B, 416/170 R, 229 R, 230, 244 R, DIG. 2, DIG. 6; 290/44, 55; 74/572.2–572.21
See application file for complete search history.

(56) References Cited

U.S. PATENT DOCUMENTS

| | | | |
|---|---|---|---|
| 757,800 A | 4/1904 | Williams | |
| 1,534,799 A | 4/1925 | Maine | |
| 2,100,310 A * | 11/1937 | Betts | 290/55 |
| 3,559,502 A * | 2/1971 | Lofthouse | 74/574.3 |
| 3,667,872 A * | 6/1972 | Norman | 417/423.14 |
| 4,039,848 A | 8/1977 | Winderl | |
| 4,048,947 A | 9/1977 | Sicard | |
| 4,115,027 A | 9/1978 | Thomas | |
| 4,208,168 A | 6/1980 | Chen et al. | |
| 4,609,827 A * | 9/1986 | Nepple | 290/44 |
| 5,009,569 A * | 4/1991 | Hector et al. | 415/4.1 |
| 5,295,411 A * | 3/1994 | Speckhart | 74/574.3 |
| 7,687,931 B2 * | 3/2010 | Gasendo | 290/54 |
| 7,841,830 B1 * | 11/2010 | Gasendo | 416/1 |
| 2004/0047733 A1 * | 3/2004 | Gasendo | 416/120 |
| 2008/0017423 A1 * | 1/2008 | Gasendo | 180/2.2 |
| 2008/0083298 A1 * | 4/2008 | Lin | 74/572.2 |
| 2009/0079198 A1 * | 3/2009 | Poo | 290/55 |

FOREIGN PATENT DOCUMENTS

PH 24174 3/1990

* cited by examiner

*Primary Examiner* — Christopher Verdier
(74) *Attorney, Agent, or Firm* — Richard S. Erbe

(57) ABSTRACT

A bamboo wind power megawatts producer is provided in which the surfaces of rotor blades capture and compress the laminar flowing wind through the turbulent rotor vortex wherein great amounts of energy are extracted from the wind in volumetric quantities within the confines of the housing assembly for rotating the power generators to produce great quantities of megawatts of electric currents after which the exhausted wind is dumped to the low pressure area leeward of the operating rotor assembly.

7 Claims, 3 Drawing Sheets

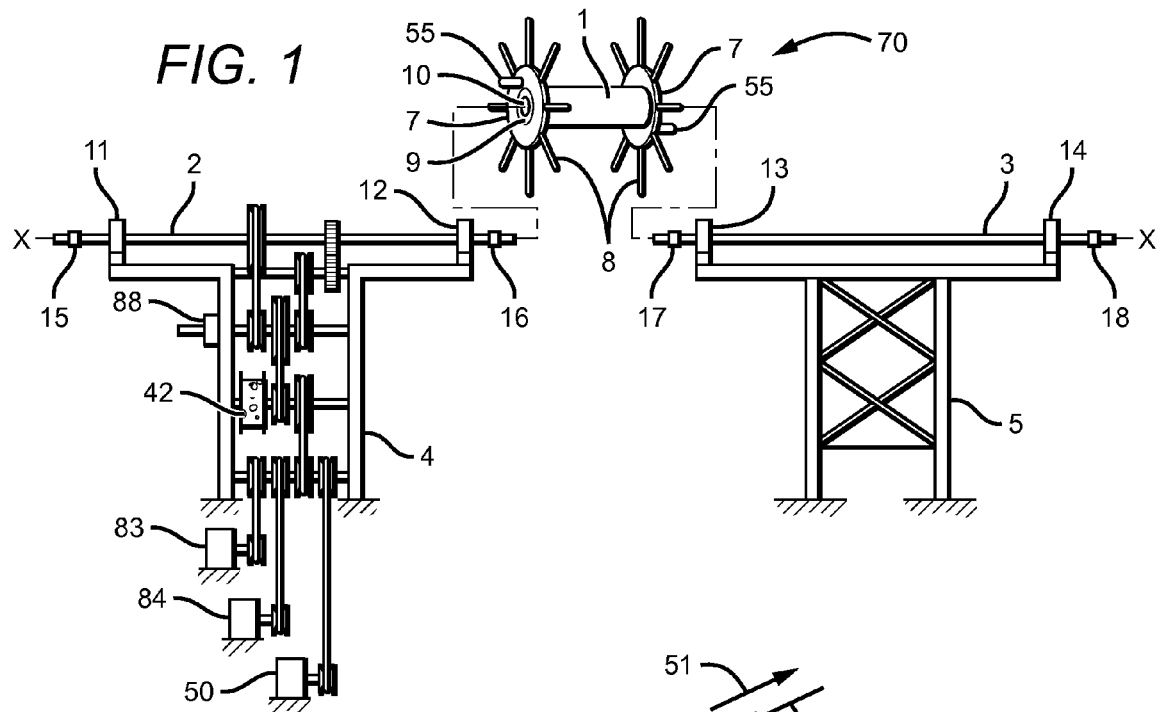
FIG. 1
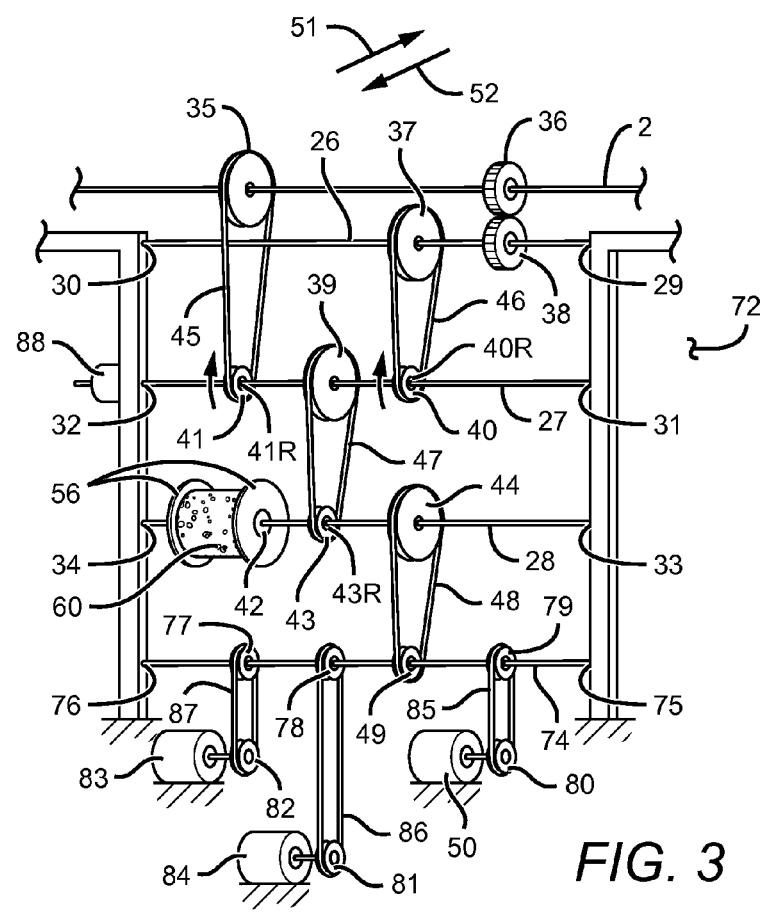
FIG. 6
FIG. 3

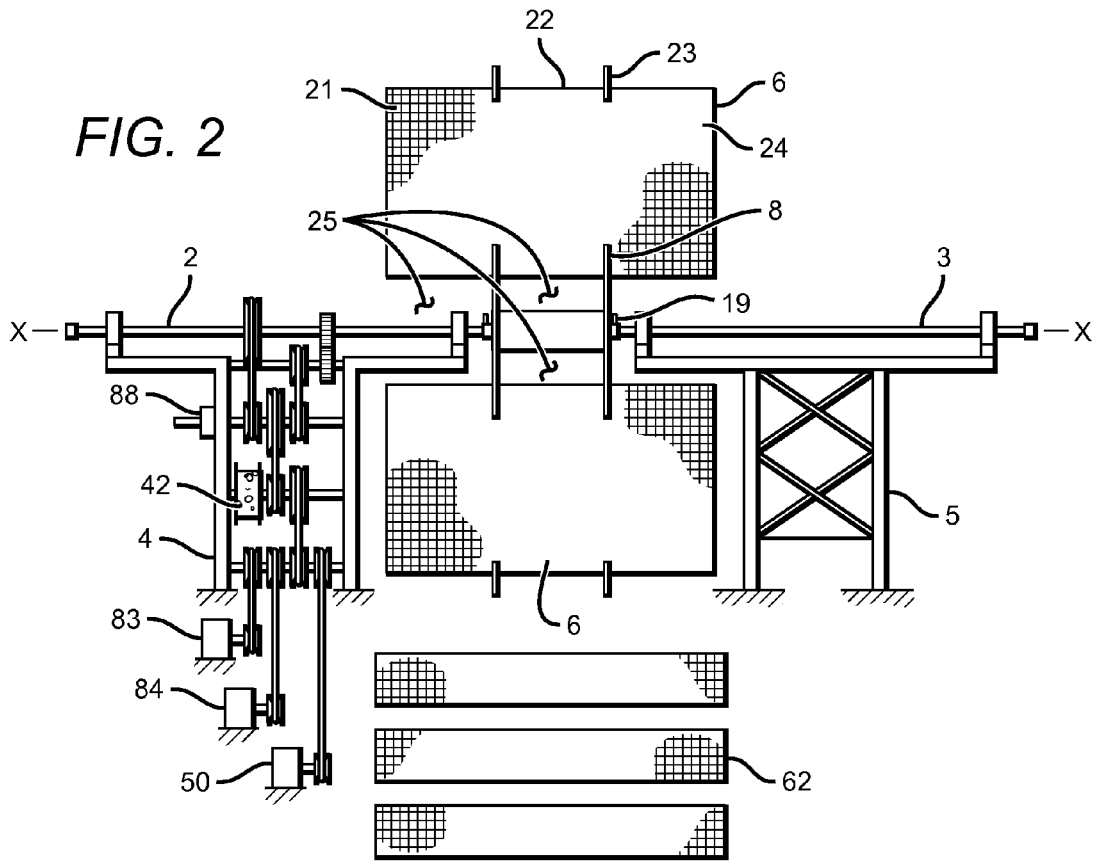
FIG. 2
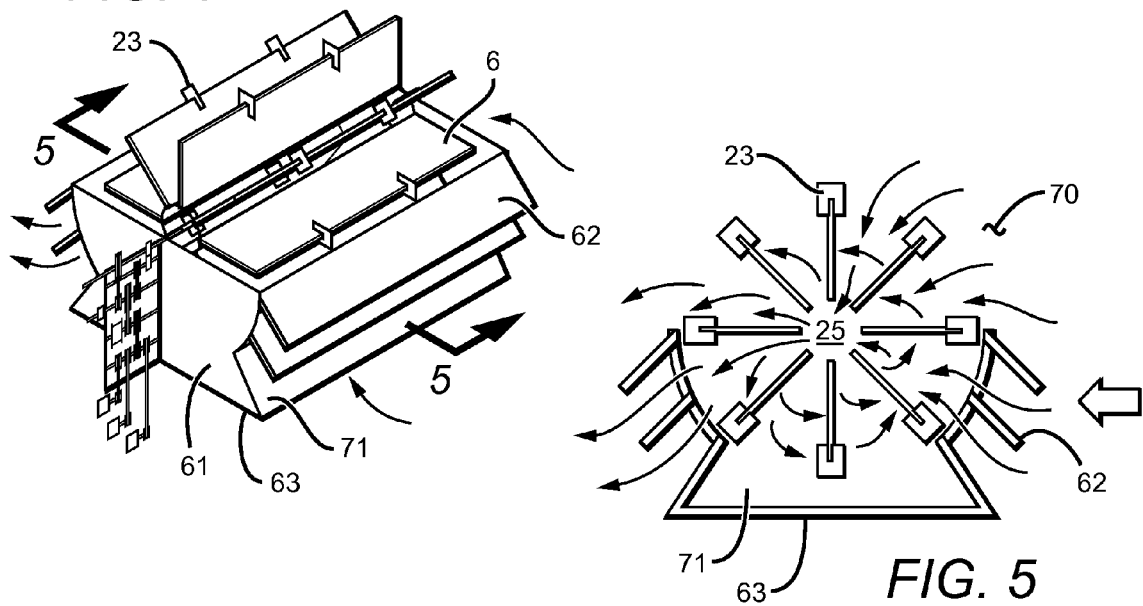
FIG. 4
FIG. 5

WIND POWER MEGAWATTS PRODUCER

BACKGROUND OF THE INVENTION

At present the prices of gasoline and electricity are so high that practically all countries of the world are looking for the cheap sources of alternative fuels. Wind power is presently used in many countries to produce electricity. However, the operating problems of the propeller windmills in the United States include: (i) the propellers are creating noise pollution and kill birds in flight, (ii) the propellers are expensive and difficult to construct using special equipments and machinery, (iii) the low efficiency propellers operate only in the high wind areas but not in the low wind areas, (iv) it takes a considerable length of time for a propeller windmill to pay back the capital invested. The wind power megawatts producer of the present invention is provided in order to rectify the operating problems of propeller windmills.

SUMMARY OF THE PRESENT INVENTION

It is the object of the present invention to provide a high efficiency wind power megawatts producer wherein the rotor blades with massive wind contact areas operate quietly at low rpm in the high wind areas as well as in the low wind areas without creating noise pollution and will not kill birds in flight.

Another object of the present invention is to provide a wind power megawatts producer that is inexpensive to construct and easy to operate. The other objects of the present invention will become apparent in the detailed description of the embodiment.

BRIEF DESCRIPTION OF THE DRAWINGS

FIG. 1 is the front view of the T-supports and drive shafts of the rotor assembly.

FIG. 2 is the front view of the T-supports and rotor blades of the rotor assembly.

FIG. 3 is the isometric view of the generator assembly.

FIG. 4 is the isometric view of the rotor assembly and housing assembly.

FIG. 5 is the cross-sectional view of the rotor assembly and the housing assembly along the line 5-5 of FIG. 4.

FIG. 6 is the isometric view of the drive shaft collar.

DESCRIPTION OF THE PREFERRED EMBODIMENT

Figure 7:
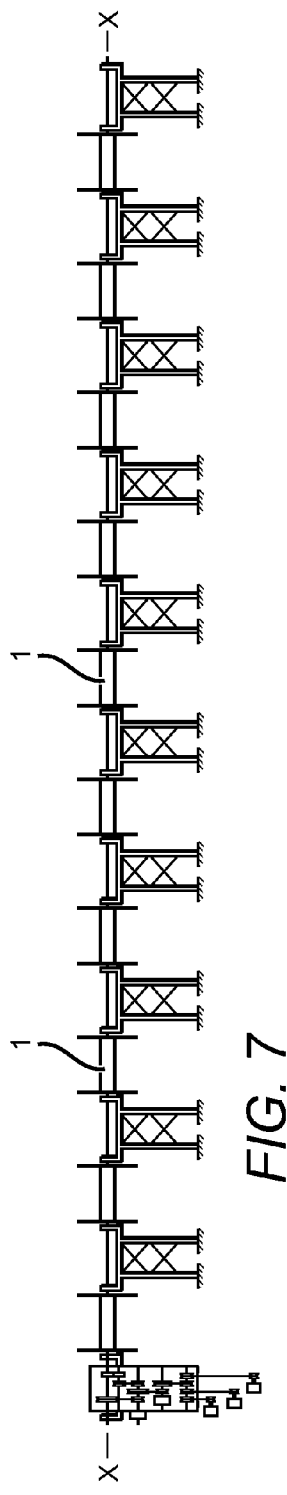
FIG. 7 is the front view of the interconnected drive shafts.

The wind power megawatts producer of the present invention comprises a rotor assembly 70, as shown in FIG. 1, a housing assembly 71, as shown in FIG. 4 and power generator assembly 72, as shown in FIG. 3 wherein the rotor assembly 70 includes a hollow drive shaft 1, a pair of solid drive shafts 2 and 3, a pair of T-supports 4 and 5 and a plurality of rotor blades 6. In FIG. 1 the drive shaft 1 includes a pair of hubs 7, a plurality of spokes 8 and a pair of end covers 9 with center holes 10. In FIG. 1 the bearing assemblies 11, 12, 13 and 14 are identical to each other and the collars 15, 16, 17 and 18 are identical to each other. Each of said collars has a stopper 19 and a tightening screw 20, as shown in FIG. 6. In FIG. 1 the drive shaft 2 is rotatably supported through the bearing assemblies 11 and 12 and the drive shaft 3 is rotatably supported through the bearing assemblies 13 and 14 such that the drive shafts 2 and 3 are co-axially rotatable about the x-x axis.

In FIG. 2 the rotor blade 6 is secured to the spokes 8 wherein a pair of mesh nettings 21 is secured to the blade frame 22, a lightweight stretchable blade cover sheet 24 is inserted between the nettings 21 and secured to the blade frame 22, and a pair of stabilizers 23 are secured to each blade 6 to prevent noise pollution during operation. There is a gap 25 between the blades 6 and the drive shafts 1, 2 and 3. As can best be seen in FIG. 2 the drive shafts 1, 2 and 3 are co-axially rotatable about the x-x axis. A segment of the solid drive shafts 2 and 3 are inserted into the holes 10 of the end covers 9 of the hollow drive shaft 1.

Referring now to power generator assembly 72 illustrated in FIG. 3 the drive shaft 26 is rotatably supported in the bearing assemblies 29 and 30, the drive shaft 27 is rotatably supported in the bearing assemblies 31 and 32 and the drive shaft 28 is rotatably supported in the bearing assemblies 33 and 34. The drive shaft 74 is rotatably supported in the bearing assemblies 75 and 76. As can best be seen in FIG. 3 the pulley 35 and the circular gear 36 are secured to the drive shaft 2, the pulley 37 and the circular gear 38 are secured to the drive shaft 26, the pulleys 39, 40 and 41 are secured to the drive shaft 27 which is provided with an automatic transmission 88, the flywheel 42, pulley 43 and pulley 44 are secured to the drive shaft 28, the pulleys 77, 78 49 and 79 are secured to the drive shaft 74. Also in FIG. 3 the drive belt 45 is rotatably engaged with the pulleys 35 and 41, the drive belt 46 is rotatably engaged with the pulleys 37 and 40, the drive belt 47 is rotatably engaged with the pulleys 39 and 43, the drive belt 48 is rotatably engaged with the pulleys 44 and 49. The drive belt 85 is rotatably engaged with the pulleys 79 and 80, the drive belt 86 is rotatably engaged with the pulleys 78 and 81 and the drive belt 87 is rotatably engaged with the pulleys 77 and 82. The pulleys 35, 37, 39, 44 and automatic transmission 88 are the rpm multipliers that enhance the rotation of the power generators 50, 83 and 84 to 1800 rpm to produce electric current. The pulley 40 includes a ratchet bearing 40R, the pulley 41 includes the ratchet bearing 41R and the pulley 43 includes a ratchet bearing 43R. The circular gear 36 intermeshes with the circular gear 38.

In FIG. 3, as the wind blows in the direction indicated by the directional arrow 51, the pulley 41 will rotate positively to the direction of the rotational arrow indicating thereof which will also rotate the power generators 50, 83 and 84 to 1800 rpm to produce electric current. At the same time the pulley 40 will rotate neutrally to the opposite direction of the rotational arrow indicating thereof without interfering with the positive rotation of the pulley 41. As the wind blows in the direction indicated by the directional arrow 52, the pulley 40 will rotate positively to the direction of the rotational arrow indicating thereof which will also rotate the power generators 50, 83 and 84 to 1800 rpm to produce electric current. At the same time the pulley 41 will rotate neutrally to the opposite direction of the rotational arrow indicating thereof without interfering with the positive rotation of the pulley 40.

Further in FIG. 3 as the operating power generator 50 exceeds 1800 rpm the power generator 83 will automatically connect on-line. As the power generator 83 exceeds 1800 rpm the power generator 84 will automatically connect on-line. As the wind suddenly drops to zero velocity the power generators 84, 83 and 50 will disconnect off-line in the reverse order. Therefore, aside from producing electric current the power generators 50, 83 and 84 will likewise operate as rpm controller and as braking mechanism to the rotor assembly 70.

In FIGS. 1, 2 and 6 the collars 16 and 17 are secured to the drive shafts 2 and 3 respectively by tightening the lock screws 20. The stoppers 19 are secured to the collars 16 and 17 through the U-connectors 55 of the drive shaft 1, thus connecting co-axially the drive shaft 1 with the drive shafts 2 and 3.

In FIG. 4 the housing assembly 71 is made of inexpensive panels comprising a plurality of rectangular baffles 62 and a pair of side walls 61. The baffles 62 are secured to the side wall 61 at an angle of 45 degrees relative to bottom floor 63 to optimize the wind energy capture efficiency.

As can best be seen in FIGS. 4 and 5, the present invention operates as follows: the wind is directed by the baffles 62 to the rotor blades 6 which extract a considerable amount of energy from the wind for rotating the rotor assembly 70. From laminar flow the wind is compressed into turbulent flow through the gap 25 vortex of the rotor assembly 70 where more energy from the wind is extracted by the blades 6 and used immediately for accelerating the power generators 50, 83 and 84 to 1800 rpm for the production of electric current. There is a massive volumetric extraction of energy from the wind through the gap 25 within the confines of the housing assembly 71. After extraction the exhausted wind is dumped by the rotor assembly 70 to the low pressure area leeward of the housing assembly 71. The pressure differential between the windward area and the leeward area of the housing assembly 71 further increases the wind flow through the vortex 25 and extracts more energy from the wind.

As shown in FIG. 5, the wind contact area used by the rotor blades 6 increases theoretically as the rotor assembly 70 accelerates to operating speed. For example at 300 rpm the 12,000 sq. ft. wind contact area used by the rotor blades 6 will increase theoretically to 3,600.000 sq. ft. for extracting the energy from the wind.

In FIG. 3 the flywheel 42 includes a plurality of peripheral holes 60 into which the lead weights and counterweights are inserted for storing more energy during operation as well as for fine tuning and spin-test balancing purposes. Flywheel 42 is provided with stabilizers 56 to suppress the vibrations of the flywheel 42 during operation. It is necessary to fine tune the flywheel 42 because an overweight, underweight or out-of-balance flywheel 42 will reduce significantly the electric current output of the power generators 50, 83 and 84.

In FIG. 7 a plurality of drive shafts 1, 2 and 3 are interconnected co-axially wherein the extended overhang of the T-supports 4 and 5 prevent the bending or sagging of the drive shafts 1, 2 and 3 during operation.

Figure 8:
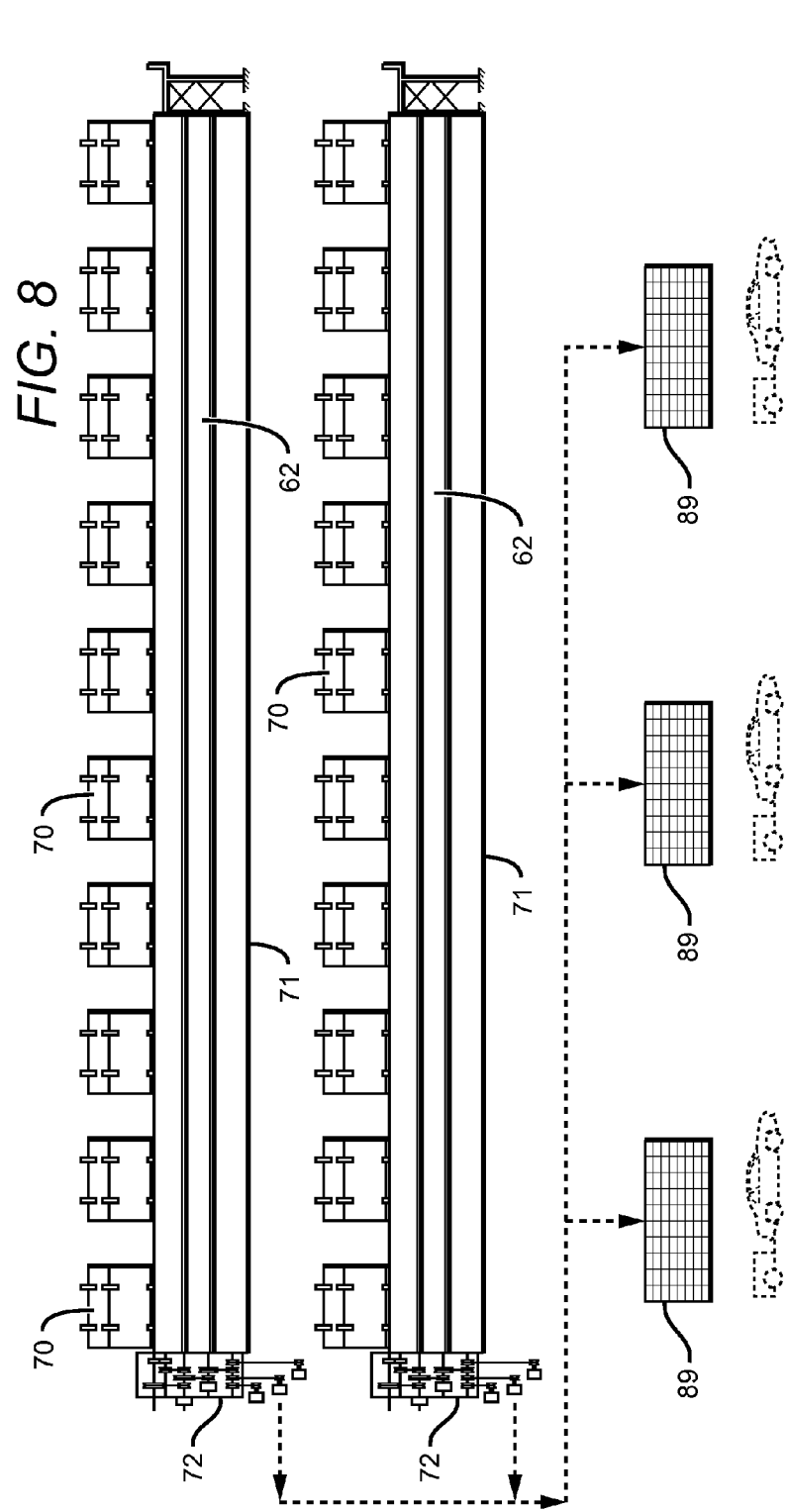
FIG. 8 is the front view of the interconnected rotor assemblies.

In FIG. 8 a plurality of rotor assemblies 70 are interconnected for charging or storing the electric current into a plurality of lithium-ion batteries 89 which are loaded on trailers (in phantom) and connected in 10 seconds with the electric cars (in phantom) that will travel 500 miles without recharging and without discharging any pollutants to the atmosphere, thus resulting in clean air.

The operating advantages of the present invention are: (i) the drive shafts 1, 2 and 3 are interconnected co-axially without bending or sagging during operation. (ii) the mesh netting 21 provides reinforcement and strength to the blade cover sheet 24, (iii) the stabilizers 23 will enable the rotor blades 6 to operate quietly without creating noise pollution and the soft flexible blade cover 24 of the rotor blade 6 will not kill birds in flight, (iv) the flywheel 42 is fine tuned by inserting the lead weights and counterweights into the peripheral holes 60 for storing more energy and for the spin-test balancing purposes wherein the stabilizers 56 are provided to suppress the vibration of the flywheel 42 during operation, (v) during emergency shutdowns the ratchet bearing 43R provide shock absorber protection to the equipments and safety protection to the operators wherein the flywheel 42 is allowed to continue rotating harmlessly until the forces of inertia are dissipated, (vi) the rotor assembly 70 extracts the wind energy in volumetric quantities within the confines of the housing assembly 71, (vii) a plurality of rotor assemblies 70, FIG. 8 will extract and combine the kinetic energy of the wind into a giant force for rotating the power generators 50, 83 and 84 to 1800 rpm to produce unlimited amounts of electric current, (viii) the rotor assembly 70 and the housing assembly 71 are inexpensive and easy to construct without using sophisticated machineries. (ix) a plurality of rotor blades 6 are provided with massive wind contact areas for extracting great amounts of energy from the wind in volumetric quantities at high efficiency for the production of inexpensive electric current.

Other modifications and changes in the construction, materials and configuration can be made to the embodiment but will be within the scope of the present invention.

I claim:

1. An apparatus for producing energy from wind comprising:
   a rotor assembly, wherein said rotor assembly further comprises:
      a hollow drive shaft;
      a pair of solid drive shafts connected to said hollow drive shaft; and
      a plurality of rotor blades connected to said hollow drive shaft, each of said rotor blades having a blade frame, mesh netting connected to said blade frame, and a lightweight stretchable cover sheet disposed within said mesh netting;
   a housing assembly mechanically connected to said rotor assembly by a power generation shaft; and
   a power generator assembly connected to said rotor assembly by a plurality of drive belts and drive pulleys.

2. The apparatus according to claim 1, further comprising a pair of stabilizers mounted on each of said blade frames.

3. The apparatus according to claim 1, wherein said power generator assembly further comprises:
   a pair of circular gears intermeshed with each other and mounted on a drive shaft; and
   said pulleys connected to said drive shafts and to said shafts.

4. The apparatus according to claim 3, wherein said power generator assembly further comprises:
   a flywheel having a plurality of peripheral holes for insertion of lead weights and counterweights; and
   a pair of stabilizers for suppressing vibrations during operation.

5. The apparatus according to claim 3, further comprising a plurality of rpm multipliers linked to said drive shafts.

6. The apparatus according to claim 1, wherein said rotor assembly, said housing assembly, and said power generator assembly are mounted on a common platform.

7. The apparatus according to claim 1, wherein said housing assembly further comprises:
   a pair of opposed side walls;
   a floor connected to said side walls; and
   a plurality of baffles attached to said side walls, said baffles oriented at an angle of 45 degrees relative to said floor.

* * * * *